(12) United States Patent
Wang et al.

(10) Patent No.: US 11,802,661 B2
(45) Date of Patent: Oct. 31, 2023

(54) COMPOSITE STRUCTURE

(71) Applicants: Chengdu BOE Optoelectronics Technology Co., Ltd., Sichuan (CN); BOE Technology Group Co., Ltd., Beijing (CN)

(72) Inventors: Yanxin Wang, Beijing (CN); Heecheol Kim, Beijing (CN)

(73) Assignees: Chengdu BOE Optoelectronics Technology Co., Ltd., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 562 days.

(21) Appl. No.: 17/044,296

(22) PCT Filed: Apr. 3, 2020

(86) PCT No.: PCT/CN2020/083331
§ 371 (c)(1),
(2) Date: Sep. 30, 2020

(87) PCT Pub. No.: WO2020/248669
PCT Pub. Date: Dec. 17, 2020

(65) Prior Publication Data
US 2021/0207770 A1 Jul. 8, 2021

(30) Foreign Application Priority Data
Jun. 14, 2019 (CN) .......................... 201910518146.8

(51) Int. Cl.
*F16S 1/10* (2006.01)
(52) U.S. Cl.
CPC ......... *F16S 1/10* (2013.01); *Y10T 428/12326* (2015.01)
(58) Field of Classification Search
CPC .................... F16S 1/10; Y10T 428/12326
See application file for complete search history.

(56) References Cited

U.S. PATENT DOCUMENTS

2005/0158573 A1* 7/2005 Elzey .................. F03G 7/065
428/593

FOREIGN PATENT DOCUMENTS

CN 1263974 A 8/2000
CN 1121538 C 9/2003
(Continued)

OTHER PUBLICATIONS

International Search Report and Written Opinion issued in PCT Application No. PCT/CN2020/083331 dated Jul. 8, 2020 with English translation, (16p).

(Continued)

*Primary Examiner* — Adam Krupicka
(74) *Attorney, Agent, or Firm* — Arch & Lake LLP

(57) ABSTRACT

The present disclosure provides a composite structure, including first and second structure layers which are opposite to each other and adjustment bodies. The first structure layer includes first structure bodies. The second structure layer includes second structure bodies. The first structure bodies and the second structure bodies are staggered. First connecting portions protruding toward the second structure layer are provided at predetermined positions on the first structure bodies where the first structure bodies are staggered relative to the second structure bodies, and second connecting portions protruding toward the first structure layer are provided at predetermined positions on the second structure bodies where the second structure bodies are staggered relative to the first structure bodies, and the first connecting portions and the second connection portions are staggered. The adjustment bodies are connected in a layer direction between the first connecting portions and the second connecting portions.

11 Claims, 2 Drawing Sheets

(56) References Cited

FOREIGN PATENT DOCUMENTS

| | | |
|---|---|---|
| CN | 103074956 A | 5/2013 |
| CN | 103295919 A | 9/2013 |
| CN | 103590533 A | 2/2014 |
| CN | 204573081 U | 8/2015 |
| CN | 207392472 U | 5/2018 |
| CN | 108315712 A | 7/2018 |
| CN | 108389886 A | 8/2018 |
| CN | 109683236 A | 4/2019 |
| CN | 110131562 A | 8/2019 |
| CN | 209245684 U | 8/2019 |
| DE | 202007018772 U1 | 4/2009 |
| JP | 2011027248 A | 2/2011 |
| TW | 201408843 A | 3/2014 |

OTHER PUBLICATIONS

First Office Action issued to Chinese Application No. 201910518146.8 dated Apr. 3, 2020 with English translation, (12p).

\* cited by examiner

COMPOSITE STRUCTURE

CROSS REFERENCE TO RELATED APPLICATIONS

The present application is the national phase application of International Application No. PCT/CN2020/083331 entitled "COMPOSITE STRUCTURE" and filed on Apr. 3, 2020, which is based on and claims priority to Chinese patent application No. 201910518146.8 filed on Jun. 14, 2019, the entire contents of which are incorporated herein as a whole by reference for all purposes.

TECHNICAL FIELD

The present disclosure relates to material manufacturing technologies, and in particular, to a composite structure.

BACKGROUND

In various technical fields, almost all materials have volume change characteristics, for example, materials may expand with heat and contract with cold, or may expand after water absorption. Although the volume change is small, in the production process of high-precision products, this volume change characteristic of the materials will bring about a very large error, resulting in the scrap of the products.

The above information disclosed in the background section is only used to enhance the understanding of the background of the present disclosure, so it may include information that does not constitute prior art known to those of ordinary skill in the art.

SUMMARY

According to an aspect of the present disclosure, there is provided a composite structure, including:
a first structure layer including a plurality of first structure bodies spaced apart from each other;
a second structure layer including a plurality of second structure bodies spaced apart from each other, the first structure bodies and the second structure bodies being staggered;
wherein first connecting portions protruding toward the second structure layer are provided at predetermined positions on the first structure bodies where the first structure bodies are staggered relative to the second structure bodies, and second connecting portions protruding toward the first structure layer are provided at predetermined positions on the second structure bodies where the second structure bodies are staggered relative to the first structure bodies, and the first connecting portions and the second connection portions are staggered;
a plurality of adjustment bodies connected in a layer direction between the first connecting portions and the second connecting portions that are staggered, wherein the plurality of adjustment bodies are used to combine the plurality of the first structure bodies and the plurality of the second structure bodies into an integrated structure;
wherein the adjustment bodies are configured to adjust gap widths between adjacent first structure bodies and gap widths between adjacent second structure bodies according to expansion coefficients of the adjustment bodies, so as to adjust an expansion coefficient of the integrated structure.

According to an exemplary embodiment of the present disclosure, the expansion coefficients are coefficients of thermal expansion or coefficients of moisture expansion.

According to an exemplary embodiment of the present disclosure, the first structure bodies are spaced apart along a first direction and the second structure bodies are spaced apart along the first direction;
each of the first structure bodies is staggered relative to two adjacent second structure bodies;
correspondingly, each of the first structure bodies includes two first connecting portions protruding toward the second structure layer, and the two first connecting portions are arranged in the first direction; and
each of the second structure bodies includes two second connecting portions protruding toward the first structure layer, and the two second connecting portions are arranged in the first direction.

According to an exemplary embodiment of the present disclosure, each of the first structure bodies correspond to two adjustment bodies, and each of the two adjustment bodies is connected to one of the first connecting portions and one of the second connecting portions along the layer direction.

According to an exemplary embodiment of the present disclosure, the first structure bodies and the second structure bodies are arranged in an array and are spaced apart;
each of the first structure bodies is staggered relative to four adjacent second structure bodies;
correspondingly, each of the first structure bodies includes four first connecting portions protruding toward the second structure layer, two of the four first connecting portions are arranged in a first direction, and the other two of the four first connecting portions are arranged in a second direction;
each of the second structure bodies includes four second connecting portions protruding toward the first structure layer, two of the four second connecting portions are arranged in the first direction, and the other two of the four second connecting portions are arranged in the second direction.

According to an exemplary embodiment of the present disclosure, each of the first structure bodies correspond to four adjustment bodies, and each of the four adjustment bodies is connected to one of the first connecting portions and one of the second connecting portions along the layer direction.

According to an exemplary embodiment of the present disclosure, the first direction is perpendicular to the second direction.

According to an exemplary embodiment of the present disclosure, the first direction is a row direction of the array, and the second direction is a row direction of the array.

According to an exemplary embodiment of the present disclosure, the first structure bodies and the second structure bodies are both square, and there is an angle of 45 degrees between the first direction and the row direction of the array.

According to an exemplary embodiment of the present disclosure, expansion coefficients of the first structure bodies are the same as that of the second structure bodies.

According to an exemplary embodiment of the present disclosure, expansion coefficients of the adjustment bodies are different from the expansion coefficients of the first structure bodies and the second structure bodies.

It should be understood that the above general description and the following detailed description are only exemplary and explanatory, and should not be construed as constituting any limitation on the present disclosure.

BRIEF DESCRIPTION OF THE DRAWINGS

The drawings, which are incorporated into the specification and constitute a part of the specification, show embodiments in accordance with the present disclosure, and are used to explain the principle of the present disclosure together with the specification. Obviously, the drawings in the following description are only some embodiments of the present disclosure. For those of ordinary skill in the art, other drawings can be obtained based on these drawings.

DETAILED DESCRIPTION

Figure 1:
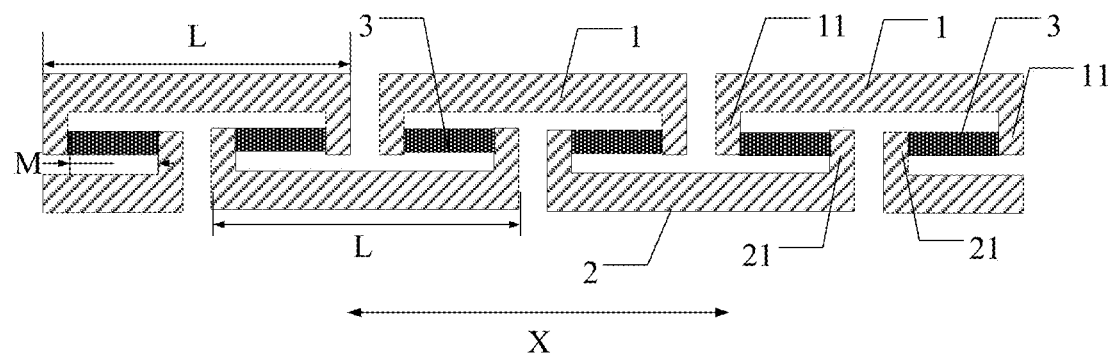
FIG. 1 is a schematic structural diagram of a composite structure according to an embodiment of the present disclosure.

Example embodiments will now be described more fully with reference to the drawings. However, the example embodiments can be implemented in various forms, and should not be construed as being limited to the examples set forth herein; on the contrary, the provision of these embodiments makes the present disclosure more comprehensive and complete, and fully conveys the concept of the example embodiments to those skilled in the art. The same reference signs in the drawing represent the same or similar structures and repeated detailed descriptions will be omitted.

Although relative terms such as "upper" and "lower" are used herein to describe the relative relationship of one component relative to another component, these terms are used only for convenience of description, for example, these terms are used according to the directions of the examples shown in drawings. It can be understood that if a device in the drawings is turned upside down, a component described as "upper" will become a "lower" component. Other relative terms, such as "high", "low", "top", "bottom", "left" and "right" have similar meanings. When a structure is "on" another structure, it may mean that the certain structure is integrally formed on the another structure, or that the certain structure is "directly" arranged on the another structure, or that the certain structure is "indirectly" arranged on the another structure through another structure.

The terms "a", "an", and "the" are used to indicate the presence of one or more elements/components/etc.; the terms "include" and "have" are used to indicate open-ended inclusion and mean that, in addition to the listed elements/components/etc., there may be additional elements/components/etc.

An exemplary embodiment provides a combined structure. FIG. 1 is a schematic structural diagram of an exemplary embodiment of the combined structure of the present disclosure. The combined structure includes a first structure layer, a second structure layer and a plurality of adjustment bodies 3. The first structure layer includes a plurality of first structure bodies 1 spaced apart from each other. The second structure layer includes a plurality of second structure bodies 2 spaced apart from each other. The first structure bodies 1 and the second structure bodies 2 are staggered. First connecting portions 11 protruding toward the second structure layer are provided at predetermined positions on the first structure bodies 1 where the first structure bodies 1 are staggered relative to the second structure bodies 2, and second connecting portions 21 protruding toward the first structure layer are provided at predetermined positions on the second structure bodies 2 where the second structure bodies 2 are staggered relative to the first structure bodies 1, and the first connecting portions 11 and the second connection portions 21 are staggered. The plurality of adjustment bodies 3 are connected in a layer direction between the first connecting portions 11 and the second connecting portions 21 that are staggered. The plurality of adjustment bodies 3 are used to combine the plurality of the first structure bodies 1 and the plurality of the second structure bodies 2 into an integrated structure.

In this exemplary embodiment, the staggered arrangement of the first connecting portions 11 and the second connecting portions 21 may mean that one of the first connecting portions 11 is located on a side of one of the second connecting portions 21 facing the portion overlapping with the first structure 1.

Embodiments of the present disclosure provide a combined structure. The combined structure includes a first structure layer, a second structure layer, and a plurality of adjustment bodies. The first structure layer includes a plurality of first structure bodies spaced apart from each other. The second structure layer includes a plurality of second structure bodies spaced apart from each other. The first structure bodies and the second structure bodies are staggered. First connecting portions protruding toward the second structure layer are provided at predetermined positions on the first structure bodies where the first structure bodies are staggered relative to the second structure bodies, and second connecting portions protruding toward the first structure layer are provided at predetermined positions on the second structure bodies where the second structure bodies are staggered relative to the first structure bodies, and the first connecting portions and the second connection portions are staggered. The plurality of adjustment bodies are connected in a layer direction between the first connecting portions and the second connecting portions that are staggered. The plurality of adjustment bodies are used to combine the plurality of the first structure bodies and the plurality of the second structure bodies into an integrated structure. In the combined structure provided by the present disclosure, when the lengths of the adjustment bodies increase, the gap widths between the first structure bodies and the gap widths between the second structure bodies are smaller, and the overall length of the combined structure decreases; when lengths of the first structure bodies and the second structure bodies increase, the overall length of the combined structure increases. Therefore, the adjustment bodies can adjust the gap widths between the adjacent first structure bodies and the gap widths between adjacent second structure bodies according to expansion coefficients of the adjustment bodies, thereby adjusting the expansion coefficient of the overall structure.

In an exemplary embodiment, the expansion coefficients are coefficients of thermal expansion or coefficients of moisture expansion. Hereinafter, exemplary embodiments will be described by taking the coefficients of thermal expansion as an example.

In an exemplary embodiment, as shown in FIG. 1, the first structure bodies 1 and the second structure bodies 2 may both be spaced apart along a first direction X. One of first structure bodies 1 may be staggered relative to two adjacent second structure bodies 2. Correspondingly, each of the first structure bodies 1 includes two first connecting portions 11 protruding toward the second structure layer, and the two first connecting portions 11 are arranged in the first direction X. Each of the second structure bodies 2 includes two second connecting portions 21 protruding toward the first structure layer, and the two second connecting portions 21 are arranged in the first direction X. Each of the first structure bodies 1 correspond to two adjustment bodies 3, and each of the two adjustment bodies 3 is connected to one of the first connecting portions 11 and one of the second connecting portions 21 along the layer direction. As shown in FIG. 1, the first connecting portions 11 may be located on both sides of a first structure body 1 in the first direction, and the second connecting portions 21 may be located on both sides of the second structure body 2. It should be understood that the first connecting portions 11 and the second connecting portions 21 may also be located in other positions. For example, the first connecting portions may be located on the inner side of the first structure body, and the second connecting portion may be located on the inner side of the second structure body.

As shown in FIG. 1, the materials of the first structure bodies 1 and the second structure bodies 2 may be the same, and the materials of the adjustment bodies 3 may be different from the materials of the first structure bodies 1 and the second structure bodies 2. When the temperature of the combined structure changes, the volumes of the first structure bodies 1 and the second structure bodies 2 and the adjustment bodies 3 change simultaneously. It is assumed that the thermal expansion coefficient of one of the adjustment bodies 3 is $\beta$ and the length of one of the adjustment bodies 3 is M, the thermal expansion coefficient of one the first structure bodies 1 or one of the second structure bodies 2 is $\alpha$, and the length of one of the first structure bodies 1 or one of the second structure bodies 2 is L. After the temperature changes, the length change of the adjustment body is $\Delta M$, and the length change of the target body is $\Delta L$. According to the law of thermodynamics, $\Delta M = M\beta\Delta T$, $\Delta L = L\alpha\Delta T$. When $2\Delta M = \Delta L$, that is, $\beta = L\alpha/2M$, the overall length of the structure along the first direction is unchanged, and the thermal expansion coefficient of the integrated structure can be considered as zero. When $2\Delta M > \Delta L$, that is, when $\beta > L\alpha/2M$, the overall length of the structure decreases in the first direction. At this time, it can be considered that the thermal expansion coefficient of the overall structure is less than zero. When $2\Delta M < \Delta L$, that is $\beta < L\alpha/2M$, the overall length of the structure along the first direction increases, and at this time, it can be considered that the thermal expansion coefficient of the overall structure is greater than zero.

Figure 2:
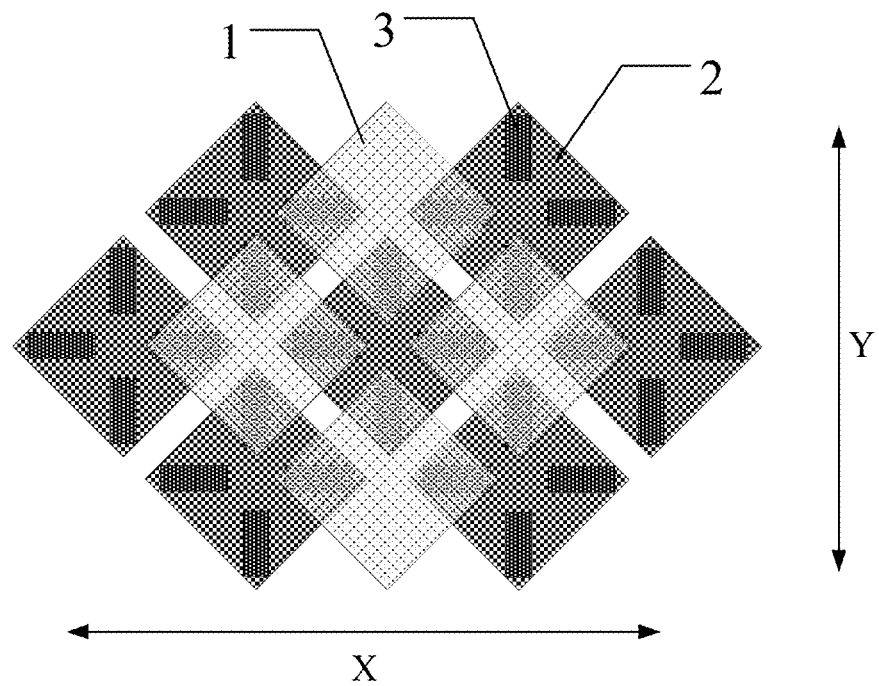
FIG. 2 is a top view of a composite structure according to an embodiment of the present disclosure.
Figure 3:
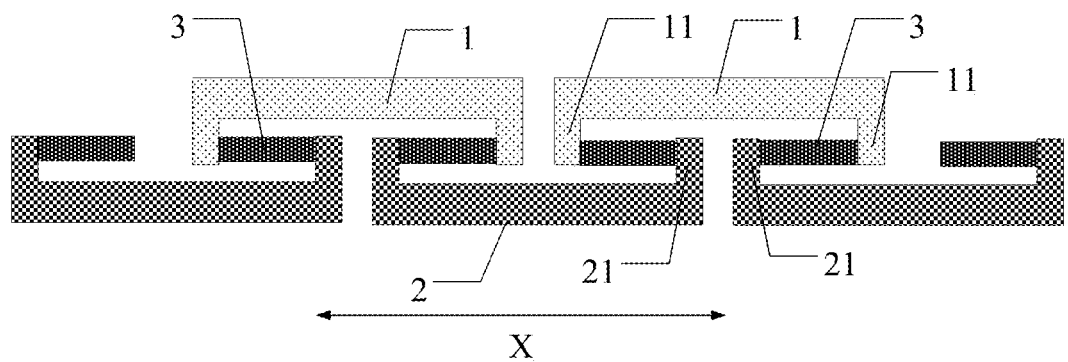
FIG. 3 is a cross-sectional view of a composite structure taken along a first direction according to an embodiment of the present disclosure.
Figure 4:
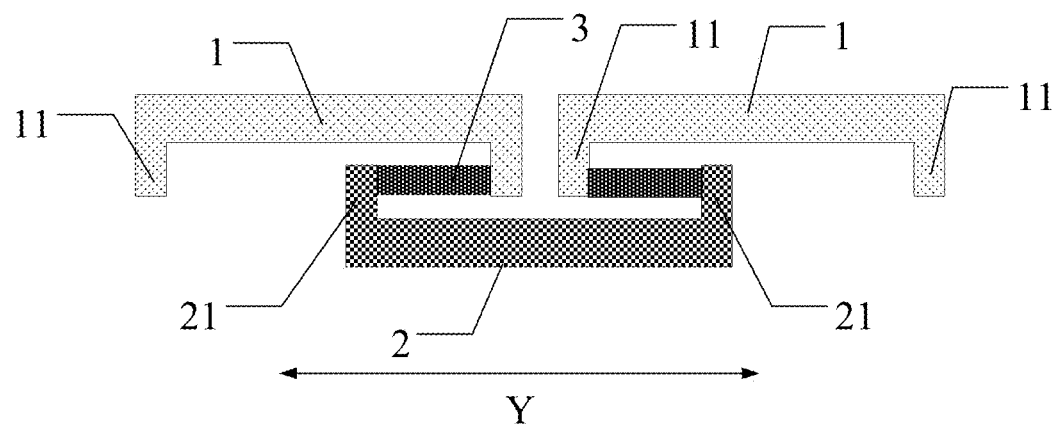
FIG. 4 is a cross-sectional view of a composite structure taken along a second direction according to an embodiment of the present disclosure.

In an exemplary embodiment, the first structure bodies 1 and the second structure bodies 2 may have more distribution modes. For example, as shown in FIGS. 2, 3, and 4. FIG. 2 is a top view of a composite structure according to an embodiment of the present disclosure. FIG. 3 is a cross-sectional view of a composite structure taken along a first direction according to an embodiment of the present disclosure. FIG. 4 is a cross-sectional view of a composite structure taken along a second direction according to an embodiment of the present disclosure. In this exemplary embodiment, the first structure bodies 1 and the second structure bodies 2 are arranged in an array and are spaced apart. Each of the first structure bodies 1 is staggered relative to four adjacent second structure bodies 2. Correspondingly, each of the first structure bodies 1 includes four first connecting portions 11 protruding toward the second structure layer, two of the four first connecting portions 11 are arranged in a first direction X, and the other two of the four first connecting portions 11 are arranged in a second direction Y. Each of the second structure bodies 2 includes four second connecting portions 21 protruding toward the first structure layer, two of the four second connecting portions 21 are arranged in the first direction X, and the other two of the four second connecting portions are arranged in the second direction Y. Each of the first structure bodies 1 correspond to four adjustment bodies 3, and each of the four adjustment bodies 3 is connected to one of the first connecting portions 1 and one of the second connecting portions 21 along the layer direction. The combined structure in this exemplary embodiment, the expansion coefficient of the overall combined structure can be adjusted in the first direction and the second direction.

In an exemplary embodiment, as shown in FIG. 2, the first direction X and the second direction Y may be perpendicular with each other. It should be understood that in other exemplary embodiments, the first direction and the second direction may also intersect with each other at other angles.

In an exemplary embodiment, as shown in FIG. 2, the first structure bodies 1 and the second structure bodies 2 may both be square, and the first direction forms an angle of 45 degrees with the row direction of the array. It should be understood that in other exemplary embodiments, the first direction and the second direction may also be other directions. For example, the first direction is the row direction of the array, and the second direction is the column direction of the array; the first structure bodies and the second structure bodies may also have other shapes, which all fall with the protection scope of the present disclosure.

Other embodiments of the present disclosure will be apparent to those skilled in the art. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope of the present disclosure is defined by the appended claims.

It should be understood that the present disclosure is not limited to the exact structures that have been described above and shown in the drawings, and various modifications and changes can be made without departing from the scope of the present disclosure. The scope of the present disclosure is defined only by the appended claims.

What is claimed is:

1. A composite structure, comprising:
   a first structure layer comprising a plurality of first structure bodies spaced apart from each other;
   a second structure layer comprising a plurality of second structure bodies spaced apart from each other, the first structure bodies and the second structure bodies being staggered;
   wherein first connecting portions protruding toward the second structure layer are provided at predetermined positions on the first structure bodies where the first structure bodies are staggered relative to the second structure bodies, and second connecting portions protruding toward the first structure layer are provided at predetermined positions on the second structure bodies where the second structure bodies are staggered relative to the first structure bodies, and the first connecting portions and the second connection portions are staggered;

a plurality of adjustment bodies connected in a layer direction between the first connecting portions and the second connecting portions that are staggered, wherein the plurality of adjustment bodies are used to combine the plurality of the first structure bodies and the plurality of the second structure bodies into an integrated structure;

wherein the adjustment bodies are configured to adjust gap widths between adjacent first structure bodies and gap widths between adjacent second structure bodies according to expansion coefficients of the adjustment bodies, so as to adjust an expansion coefficient of the integrated structure.

2. The composite structure according to claim 1, wherein the expansion coefficients are coefficients of thermal expansion or coefficients of moisture expansion.

3. The composite structure according to claim 1, wherein:
the first structure bodies are spaced apart along a first direction and the second structure bodies are spaced apart along the first direction;
each of the first structure bodies is staggered relative to two adjacent second structure bodies;
each of the first structure bodies comprises two first connecting portions protruding toward the second structure layer, and the two first connecting portions are arranged in the first direction; and
each of the second structure bodies comprises two second connecting portions protruding toward the first structure layer, and the two second connecting portions are arranged in the first direction.

4. The composite structure according to claim 3, wherein each of the first structure bodies correspond to two adjustment bodies, and each of the two adjustment bodies is connected to one of the first connecting portions and one of the second connecting portions along the layer direction.

5. The composite structure according to claim 1, wherein:
the first structure bodies and the second structure bodies are arranged in an array and are spaced apart;
each of the first structure bodies is staggered relative to four adjacent second structure bodies;
each of the first structure bodies comprises four first connecting portions protruding toward the second structure layer, two of the four first connecting portions are arranged in a first direction, and the other two of the four first connecting portions are arranged in a second direction;
each of the second structure bodies comprises four second connecting portions protruding toward the first structure layer, two of the four second connecting portions are arranged in the first direction, and the other two of the four second connecting portions are arranged in the second direction.

6. The composite structure according to claim 5, wherein each of the first structure bodies correspond to four adjustment bodies, and each of the four adjustment bodies is connected to one of the first connecting portions and one of the second connecting portions along the layer direction.

7. The composite structure according to claim 5, wherein the first direction is perpendicular to the second direction.

8. The composite structure according to claim 7, wherein the first direction is a row direction of the array, and the second direction is a row direction of the array.

9. The composite structure according to claim 5, wherein the first structure bodies and the second structure bodies are both square, and there is an angle of 45 degrees between the first direction and the row direction of the array.

10. The composite structure according to claim 1, wherein expansion coefficients of the first structure bodies are the same as that of the second structure bodies.

11. The composite structure according to claim 10, wherein expansion coefficients of the adjustment bodies are different from the expansion coefficients of the first structure bodies and the second structure bodies.

* * * * *